(12) United States Patent
Lee et al.

(10) Patent No.: US 8,501,333 B2
(45) Date of Patent: Aug. 6, 2013

(54) CAP ASSEMBLY AND SECONDARY BATTERY USING THE SAME

(75) Inventors: Je-Jun Lee, Daejeon (KR); Sung-Jong Kim, Daejeon (KR); Cha-Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/292,537

(22) Filed: Nov. 9, 2011

(65) Prior Publication Data
US 2012/0100404 A1    Apr. 26, 2012

Related U.S. Application Data

(63) Continuation of application No. PCT/KR2010/007846, filed on Nov. 8, 2010.

(30) Foreign Application Priority Data

Oct. 21, 2010 (KR) .................. 10-2010-0103001

(51) Int. Cl.
*H01M 2/02* (2006.01)
(52) U.S. Cl.
USPC ............................................. 429/82
(58) Field of Classification Search
None
See application file for complete search history.

(56) References Cited

U.S. PATENT DOCUMENTS

| | | | |
|---|---|---|---|
| 2004/0241536 A1* | 12/2004 | Kim | 429/65 |
| 2009/0098445 A1 | 4/2009 | Kim | |
| 2009/0117459 A1* | 5/2009 | Hyung et al. | 429/185 |
| 2010/0216013 A1 | 8/2010 | Kim | |

FOREIGN PATENT DOCUMENTS

| | | |
|---|---|---|
| KR | 20010038810 A | 5/2001 |
| KR | 20060020211 A | 3/2006 |
| KR | 20070107922 A | 11/2007 |
| KR | 20090027316 A | 3/2009 |
| KR | 20090046469 A | 5/2009 |

* cited by examiner

*Primary Examiner* — Patrick Ryan
*Assistant Examiner* — Yoshitoshi Takeuchi
(74) *Attorney, Agent, or Firm* — Lerner, David, Littenberg, Krumholz & Mentlik, LLP

(57) ABSTRACT

A cap assembly for a secondary battery is coupled to an open end of a battery can receiving an electrode assembly in which a separator is interposed between cathode and anode plates, and includes a top cap disposed on an uppermost portion in a protrusive form to form a cathode terminal; a safety element disposed below the top cap to contact the top cap; a safety vent disposed to contact the safety element; a current intercepting member having an upper portion welded to a lower end of the safety vent and a lower portion capable of being connected to the electrode assembly; a first gasket surrounding an outer circumference of the current intercepting member; and a second gasket surrounding the rims of the top cap, the safety element, and the safety vent, and a lower end portion extending to surround the lower portion of the current intercepting member.

16 Claims, 4 Drawing Sheets

CAP ASSEMBLY AND SECONDARY BATTERY USING THE SAME

CROSS-REFERENCE TO RELATED APPLICATION

This application is a continuation of International Application No. PCT/KR2010/007846 filed on Nov. 8, 2010, which claims priority under 35 USC 119(a) to Korean Patent Application No. 10-2010-0103001 filed in Republic of Korea on Oct. 21, 2010, the entire contents of which are incorporated herein by reference.

TECHNICAL FIELD

The present disclosure relates to a secondary battery and a cap assembly used for the same, and more particularly, to a cap assembly having a gasket with an improved structure to reinforce the safety against an external impact and a secondary battery including the same.

BACKGROUND ART

Generally, a secondary battery refers to a rechargeable battery, while a primary battery refers to a non-rechargeable battery. Secondary batteries are widely used for electronic devices such as cellular phones, notebook computers, video cameras, electric vehicles, or the like. In particular, a lithium secondary battery has an operating voltage of about 3.6 V, triple the capacity of nickel-cadmium batteries or nickel hydrogen batteries generally used as power sources of electronic devices, and due to its high energy density per unit weight, are being utilized more and more.

The lithium secondary battery generally uses lithium oxide and carbonaceous material as cathode active material and anode active material, respectively. The lithium secondary battery includes an electrode assembly in which a cathode plate and an anode plate respectively coated with the cathode active material and the anode active material are disposed with a separator being interposed between them, and an exterior material which seals and receives the electrode assembly together with an electrolyte.

Meanwhile, the lithium secondary battery may be classified into a can type secondary battery where the electrode assembly is included in a metal can and a pouch type battery where the electrode assembly is included in a pouch of an aluminum laminate depending on the shape of the battery case. In addition, the can type secondary battery may further be classified into a cylindrical battery and a rectangular battery depending on the shape of the metal can. The exterior material of the rectangular or cylindrical secondary battery includes a battery can and a cap assembly sealably coupled to an open end the battery can.

FIG. 1 is a sectional view showing a cap assembly 10 of a conventional cylindrical secondary battery.

Referring to FIG. 1, the cylindrical secondary battery generally includes a cylindrical battery can 20, a jelly-roll type electrode assembly 30 received in the battery can 20, a cap assembly 10 coupled to the upper portion of the battery can 20, a beading portion 40 provided at the front end of the battery can 20 for mounting the cap assembly 10, and a crimping portion 50 for sealing the battery.

The electrode assembly 30 is wound into a jelly-roll shape in a state where a separator is interposed between a cathode and an anode. A cathode lead 31 is attached to the cathode and connected to the cap assembly 10, and an anode lead (not shown) is attached to the anode and connected to the lower end of the battery can 20.

The cap assembly 10 includes a top cap 11 forming a cathode terminal, a safety element 12 such as a Positive Temperature Coefficient (PTC) element for intercepting a current by increasing the resistance when the temperature in the battery increases, a safety vent 13 for intercepting a current and/or for exhausting gas when the pressure in the battery increases, a first gasket 14 for electrically separating a safety vent 13 except for a specific portion from a current intercepting member 15, and a current intercepting member 15 connected to a cathode lead 31 connected to the cathode, which are laminated in the above order. In addition, the cap assembly 10 is mounted to the beading portion 40 of the battery can 20 in a state of being mounted to a second gasket 16. Therefore, in a normal operating condition, the cathode of the electrode assembly is electrically connected to the top cap 11 via the cathode lead 31, the current intercepting member 15, the safety vent 13, and the safety element 12. However, if gas is generated from the electrode assembly 30 due to overcharging or the like to increase the inner pressure, the safety vent 13 inverts its shape to protrude upward, and at this time the safety vent 13 separates from the current intercepting member 15 to intercept the current. Therefore, the charging/discharging work does not proceed any further, thereby ensuring the safety of the secondary battery. Further, if the inner pressure of the secondary battery increases over a certain value, the safety vent 13 fractures, and the pressurized gas exhausts through a gas hole formed in the top cap 11 via the fractured portion, thereby preventing the battery from exploding.

However, in the above conventional cap assembly 10, in a case where an impact is applied from the outside to the side of the battery can 20, the safety of the secondary battery may not be ensured. For example, in a case where an impact is applied to the side of the secondary battery, the battery can 20 may deform to bend inwards, and at this time the current intercepting member 15 may separate from the first gasket 14 to contact the battery can 20. Generally, the current intercepting member 15 is connected to the cathode, and the battery can 20 is connected to the anode. Therefore, if the current intercepting member 15 contacts the battery can 20 as mentioned above, a short may occur at the inside of the secondary battery, which may cause problems such as fracturing, firing or exploding of the secondary battery.

DISCLOSURE

Technical Problem

The present disclosure is designed to solve the problems of the prior art, and therefore it is an object of the present disclosure to provide a cap assembly having an improved structure for ensuring the safety of a secondary battery by preventing a short from occurring at the inside of the secondary battery due to an external impact, and a secondary battery using the same.

Other objects and advantages of the present disclosure will be understood from the following description and become more apparent by embodiments of the present disclosure. In addition, it could be easily understood that the objects and advantages of the present disclosure can be implemented by means and their combinations defined in the claims.

Technical Solution

According to an embodiment of the present disclosure, there is provided a cap assembly for a secondary battery, coupled to an open end of a battery can receiving an electrode assembly in which a cathode plate and an anode plate are disposed with a separator being interposed between them, which includes a top cap disposed on an uppermost portion in a protrusive form to form a cathode terminal; a safety element disposed below the top cap to contact the top cap; a safety vent disposed to contact the safety element; a current intercepting member having an upper portion welded to a lower end of the safety vent and a lower portion capable of connecting to the electrode assembly; a first gasket surrounding an outer circumference of the current intercepting member; and a second gasket surrounding the rims of the top cap, the safety element and the safety vent, and having a lower end portion extending to surround the lower portion of the current intercepting member.

Preferably, the first gasket contacts the upper and side portions of the current intercepting member, and the second gasket contacts the lower portion of the current intercepting member.

Also preferably, a space is formed in a horizontal direction between the first gasket and the second gasket.

According to another embodiment of the present disclosure, there is also provided a secondary battery, which includes an electrode assembly in which a cathode plate and an anode plate are disposed with a separator being interposed between them; a battery can receiving the electrode assembly and an electrolyte; and a cap assembly including: a top cap disposed on an uppermost portion in a protrusive form to form a cathode terminal; a safety element disposed below the top cap to contact the top cap; a safety vent disposed to contact the safety element; a current intercepting member having an upper portion welded to a lower end of the safety vent and a lower portion capable of connecting to the electrode assembly; a first gasket surrounding an outer circumference of the current intercepting member; and a second gasket surrounding the rims of the top cap, the safety element and the safety vent, and having a lower end portion extending to surround the lower portion of the current intercepting member.

Preferably, the first gasket contacts the upper and side portions of the current intercepting member, and the second gasket contacts the lower portion of the current intercepting member.

Also preferably, a space is formed in a horizontal direction between the first gasket and the second gasket.

Advantageous Effects

According to the present disclosure, since a cap assembly is formed in a dual structure having a first gasket surrounding a current intercepting member and a second gasket surrounding a top cap, a safety element and a safety vent, even though an external impact is applied to the secondary battery, it is possible to securely prevent the current intercepting member from contacting the battery can.

Therefore, by preventing a short from occurring in the secondary battery due to an external impact, particularly an impact applied to the side of the battery can, it is possible to prevent accidents such as damaging, firing and exploding of the secondary battery.

Further, in a case where the cap assembly according to the present disclosure is applied to a secondary battery not having a beading portion, the inner space of the cap assembly may increase to receive a larger electrode assembly, thereby ensuring the safety of the secondary battery and increasing the capacity of the secondary battery at the same time.

DESCRIPTION OF DRAWINGS

Other objects and aspects of the present disclosure will become apparent from the following description of embodiments with reference to the accompanying drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
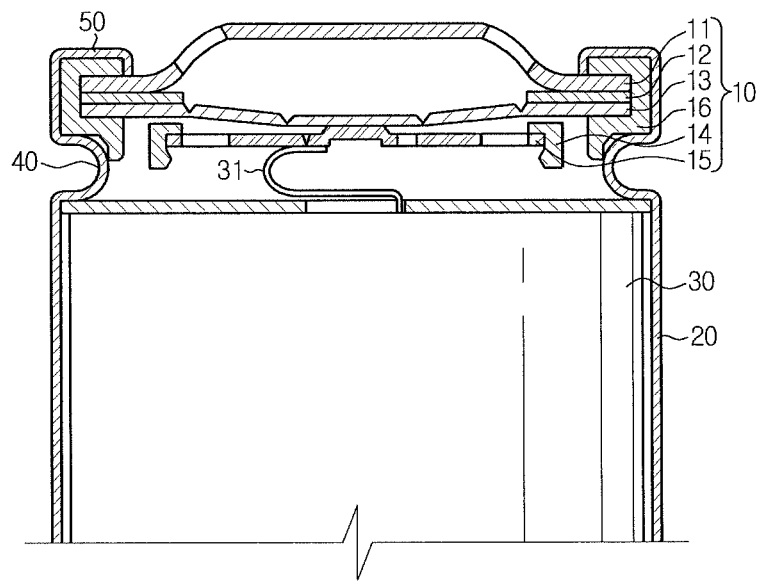
FIG. 1 is a cross-sectional view showing a cap assembly of a conventional cylindrical secondary battery.
Figure 2:
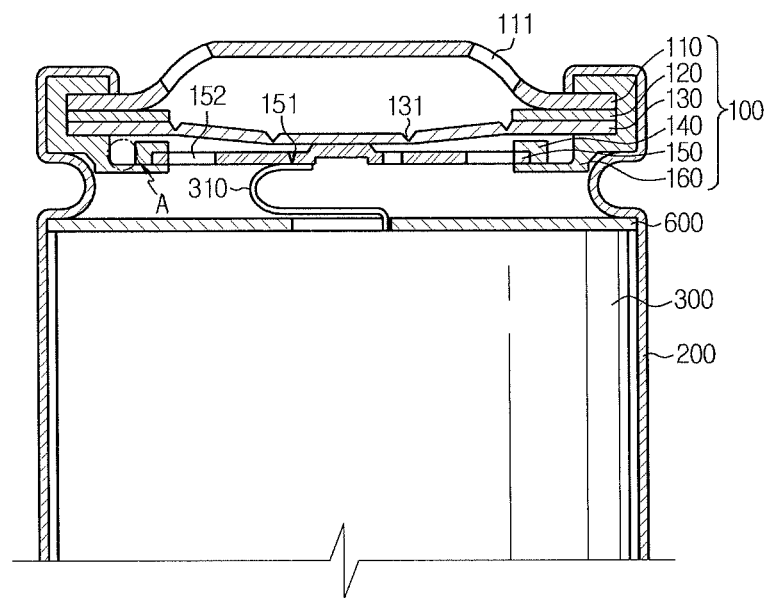
FIG. 2 is a cross-sectional view schematically showing a cap assembly of a secondary battery according to an embodiment of the present disclosure.

FIG. 2 is a cross-sectional view schematically showing a cap assembly 100 of a secondary battery according to an embodiment of the present disclosure.

Referring to FIG. 2, the secondary battery according to the present disclosure includes an electrode assembly 300, a battery can 200, and a cap assembly 100.

The electrode assembly 300 includes a cathode plate and an anode plate disposed with a separator being interposed between them, and is received in a battery can 200. At this time, the electrode assembly 300 is also called a jelly roll since it is wound and disposed in a jelly-roll form. Electrode plates of the electrode assembly 300 are configured so that a current collector is coated with an active material slurry, and the slurry may generally form by stirring active material particles, auxiliary conductor, binder, plasticizer and so on, to which a solvent is added. Non-coating portions are preferably present at starting and ending portions of the current collector in a winding direction of the electrode plates, and an electrode lead 310 corresponding to each electrode plate may attach to the non-coating portion. Generally, the cathode lead attached to the upper end of the electrode assembly 300 is electrically connected to the cap assembly 100, and the anode lead attached to the lower end of the electrode assembly 300 is preferably connected to the bottom of the battery can 200.

Meanwhile, an upper insulation plate 600 may dispose at the upper end of the electrode assembly 300. The upper insulation plate plays a role of insulating the electrode assembly 300 from the cap assembly 100.

The battery can 200 is a light conductive metal material such as aluminum, stainless steel, or their alloys, and it may have a cylindrical structure with an opening at an upper end and a closed bottom opposite to the opening. In the inner space of the battery can 200, the electrode assembly 300 is received together with an electrolyte.

The cap assembly 100 for a secondary battery according to the present disclosure includes a top cap 110, a safety element 120, a safety vent 130, a current intercepting member 150, a first gasket 140, and a second gasket 160.

The top cap 110 is disposed at the uppermost portion of the cap assembly 100 to protrude upwards, thereby forming a cathode terminal. Therefore, the top cap 110 allows electric connection to the outside. In addition, a gas hole 111 for discharging gas may form in the top cap 110. Therefore, when gas is generated from the electrode assembly 300, the gas may discharge out of the battery can 200 through the gas hole 111. The top cap 110 may be made of, for example, metal material such as stainless steel and aluminum.

The safety element 120 is interposed between the top cap 110 and the safety vent 130 to electrically connect the top cap 110 to the safety vent 130. The safety element 120 is used for intercepting the current flow in the battery due to overheating of the battery, and it may be formed with, for example, a positive temperature coefficient (PTC) element.

The safety vent 130 is disposed below the safety element 120 to contact the safety element 120, and it is configured to fracture when the inner pressure of the secondary battery increases over a predetermined level. For example, the safety vent 130 may fracture when the inner pressure of the secondary battery is 12 to 25 kgf/cm$^2$. The safety vent 130 is formed so that its center portion protrudes downwards as shown in the figure, and a predetermined notch 131 may form near the center portion. Therefore, if gas is generated in the secondary battery, namely from the electrode assembly 300 to increase the inner pressure, the safety vent 130 inverts its shape to protrude upwards and is fractured around the notches 131. Therefore, the gas filled in the battery can 200 may discharge out through the fractured region of the safety vent 130.

At least a partial upper portion of the current intercepting member 150 may weld to the lower end of the safety vent 130. Therefore, in a normal state, the lower protrusive portion of the safety vent 130 contacts the current intercepting member 150, and, if the shape of the safety vent 130 inverts due to the increase of the inner pressure caused by gas generation, the electric connection between the current intercepting member 150 and the safety vent 130 is intercepted. In addition, the lower portion of the current intercepting member 150 may connect to the electrode assembly 300, in more detail to the electrode lead 310 attached to the electrode assembly 300. Therefore, in a normal state, the current intercepting member 150 allows electric connection between the electrode assembly 300 and the safety vent 130. A notch 151 may form at a predetermined portion of the current intercepting member 150, and the current intercepting member 150 may deform together with the safety vent 130 due to the inner pressure of the secondary battery.

The first gasket 140 is a gasket for the current intercepting member 150 and is configured to surround the outer circumference of the current intercepting member 150. In particular, the first gasket 140 contacts the upper and side portions of the outer circumference of the current intercepting member 150 to support the upper and side portions of the current intercepting member 150. In addition, the first gasket 140 electrically insulates the current intercepting member 150 and the safety vent 130 from each other, except for the contact portion between the protrusive portion of the safety vent 130 and the current intercepting member 150.

The second gasket 160 surrounds the top cap 110, the safety element 120, and the rim portion of the safety vent 130. Therefore, the upper end portion of the second gasket 160 may bend in a 'C' shape pattern as shown in the figure. The second gasket 160 may be made of material with electric insulation, impact resistance, elasticity and endurance, for example polyolefin or polypropylene (PP). In addition, the gasket may not be thermally treated but bend by mechanical processing in order to prevent the insulation from weakening.

In particular, the lower end portion of the second gasket 160 of the cap assembly 100 for a secondary battery according to the present disclosure extends to the lower portion of the current intercepting member 150, so that the lower end portion of the second gasket 160 is configured to surround the lower portion of the current intercepting member 150. Therefore, the second gasket 160 supports and protects the current intercepting member 150 together with the first gasket 140. Further, due to the configuration of the second gasket 160, in the case an impact is applied to the side of the battery can 200 so that the battery can 200 deforms inwards, the lower end portion of the second gasket 160 further moves inwards below the current intercepting member 150, and therefore the second gasket 160 may more securely surround and support the lower portion of the current intercepting member 150.

Meanwhile, the current intercepting member 150 may have a gas discharge hole 152 for discharging gas, generated in the secondary battery, out of the current intercepting member 150. At this time, the lower end portion of the second gasket 160 extends to the lower portion of the current intercepting member 160, and as shown in the figure, is preferably configured not to block the gas discharge hole 152 of the current intercepting member 150. However, the present disclosure is not limited thereto, and the lower end portion of the second gasket 160 may also form to block at least a part of the gas discharge hole 152 of the current intercepting member 150.

Preferably, as shown in the figure, the first gasket 140 contacts the upper and side portions of the current intercepting member 150, and the second gasket 160 contacts the lower portion of the current intercepting member 150. In this embodiment, the upper portion of the current intercepting member 150 is supported and protected by the first gasket 140, and the lower portion thereof is supported and protected by the second gasket 160. In addition, the side portion of the current intercepting member 150 is doubly supported and protected by the first gasket 140 and the second gasket 160. Therefore, even though an external impact is applied to the side of the battery can 200, since the first gasket 140 and the second gasket 160 securely support and protect the upper, lower and side portions of the current intercepting member 150, it is possible to prevent the current intercepting member 150 from deviating. Therefore, since the current intercepting member 150 may freely move in the secondary battery, it is possible to prevent contact with the battery can 200 which causes a short. Further, in this embodiment, since the second gasket 160 is configured to closely adhere to and contact the lower portion of the current intercepting member 150, the lower space of the current intercepting member 150 is ensured to increase the receiving space of the electrode assembly 300, and therefore the capacity of the secondary battery may increase more easily.

Also preferably, as shown by "A" in the figure, a consistent space is preferably formed in the horizontal direction between the first gasket 140 and the second gasket 160. If an empty portion is formed between the first gasket 140 and the second gasket 160 as described above, when an external impact is applied, the impact transferred to the second gasket 160 is not directly transferred to the side of the first gasket 140, and therefore the impact transferred to the current intercepting member 150 may be further lessened. Therefore, it is possible to effectively prevent fracture of the current intercepting member 150 or separation of the first gasket 140 and the second gasket 160 due to an external impact.

Meanwhile, the configuration of the cap assembly 100 shown in FIG. 2 is just an example, and each component of the cap assembly 100 such as the first gasket 140 and the second gasket 160 may be configured in various ways, as apparent to those having ordinary skill in the art.

FIGS. 3 to 6 are cross-sectional views schematically showing the cap assembly 100 of a secondary battery according to other embodiments of the present disclosure. Regarding FIGS. 3 to 6, a component which may be described in the same way as in the cap assembly 100 of FIG. 2 will not be described again, and the following description will focus on the different points compared with FIG. 2.

Referring to FIGS. 3 to 6, the lower end portion of the second gasket 160 extends to the lower portion of the first gasket 140 and the lower portion of the current intercepting member 150 to surround, support, and protect the lower portion of the current intercepting member 150.

Figure 3:
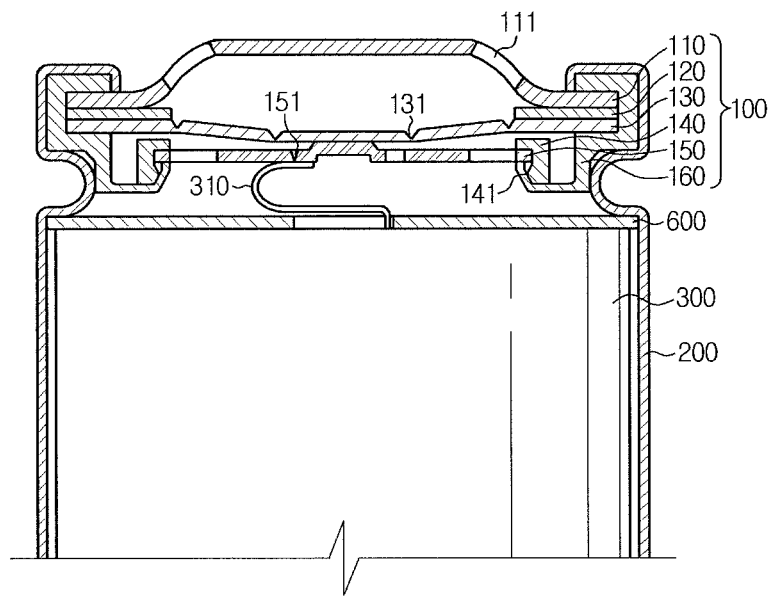
FIGS. 3 to 6 are cross-sectional views schematically showing a cap assembly of a secondary battery according to other embodiments of the present disclosure.
Figure 4:
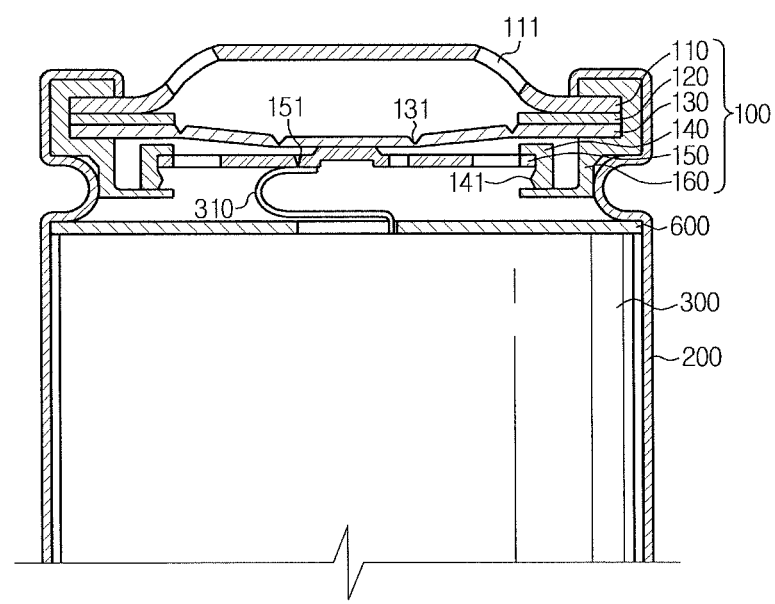

In more detail, in the embodiment of FIG. 3, the lower end portion of the second gasket 160 extends to contact the lower portions of the first gasket 140 and the current intercepting member 150, and in the embodiment of FIG. 4, the lower end portion of the second gasket 160 extends in the horizontal direction to contact only the lower portion of the first gasket 140 and not to contact the lower portion of the current intercepting member 150. In other words, the extending lower end portion of the second gasket 160 may surround the lower portion of the current intercepting member 150 in direct contact with the lower portion of the current intercepting member 150, and may also surround the lower portion of the current intercepting member 150 in a state not contacting with but spaced by a predetermined distance from the lower portion of the current intercepting member 150.

Figure 5:
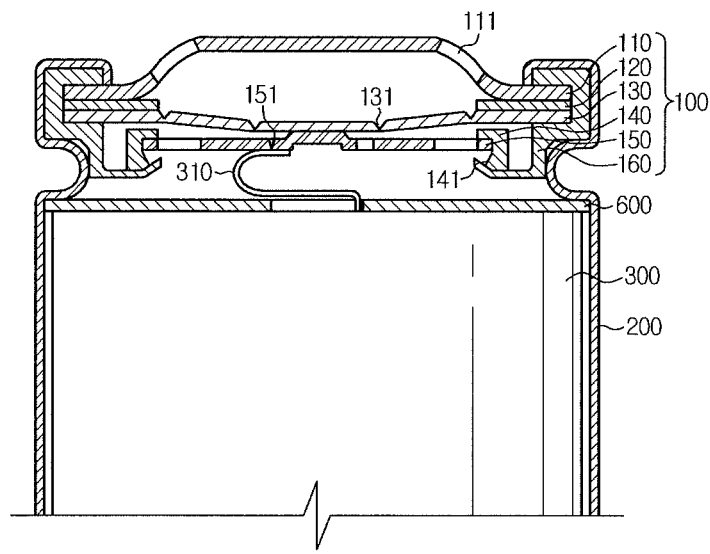

In addition, as shown in FIG. 5, the extending lower end portion of the second gasket 160 may be configured not to directly contact with the lower portion of the current intercepting member 150, while not extending in the horizontal direction as in FIG. 4 but bending and extending toward the current intercepting member 150.

Meanwhile, in FIGS. 3 to 5, a protrusion 141 is present on the lower portion of the first gasket 140 so that the protrusion 141 of the first gasket 140 supports the lower portion of the current intercepting member 150. In this case, the first gasket 140 may be coupled to the current intercepting member 150 by fitting. However, the present disclosure is not limited to the above configuration of the first gasket 140.

Figure 6:
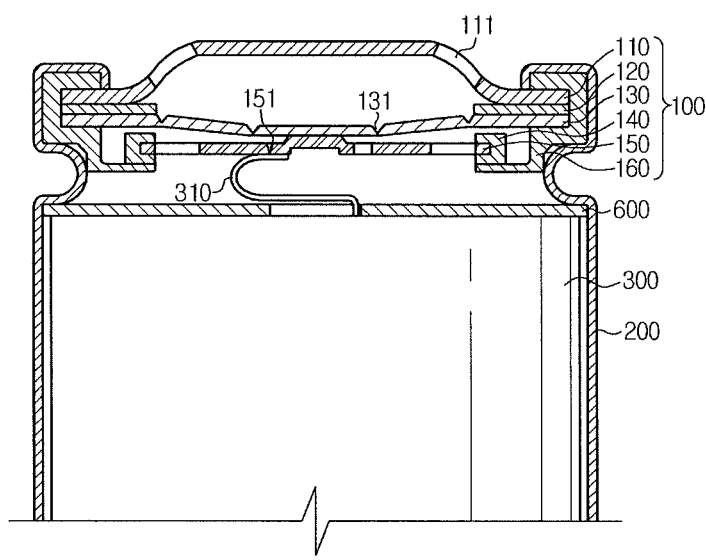

For example, as shown in FIG. 6, the first gasket 140 may have a 'C' shape to more securely surround the rim of the current intercepting member 150. In this case, the lower end portion of the second gasket 160 may extend to contact the lower portion of the first gasket 140 to support and protect the first gasket 140 and the current intercepting member 150. Besides, the first gasket 140 may have various shapes, and the second gasket 160 may also be configured in various ways accordingly, as apparent to those having ordinary skill in the art.

Even in the embodiments shown in FIGS. 3 to 6, since the second gasket 160 extends to surround the lower portion of the current intercepting member 150, the second gasket 160 may support and protect the current intercepting member 150 together with the first gasket 140. In particular, in a case where an external impact is applied to the side of the battery can 200 so that the battery can 200 is deformed inwards, the lower end portion of the second gasket 160 may move to the center portion of the current intercepting member 150 so that the lower portion of the current intercepting member 150 may be more securely supported and protected by the second gasket 160.

Preferably, in the secondary battery according to the present disclosure, the battery can 200 may not have a beading portion. In other words, the cap assembly 100 according to the present disclosure is preferably applied to a secondary battery where a beading portion is not formed.

Figure 7:
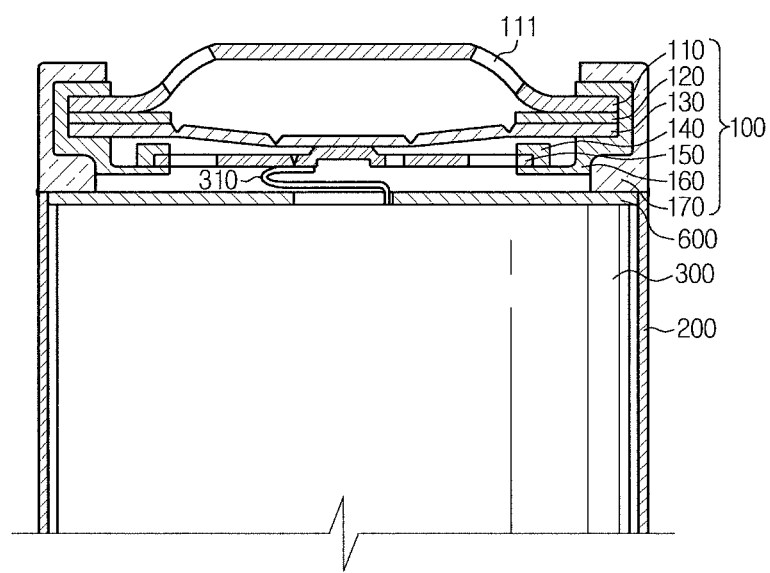
FIG. 7 is a cross-sectional view schematically showing a cap assembly of a secondary battery according to still another embodiment of the present disclosure.

FIG. 7 is a cross-sectional view schematically showing the cap assembly 100 of a secondary battery according to still another embodiment of the present disclosure.

Referring to FIG. 7, the cap assembly 100 according to the present disclosure may be mounted to an open end of the battery can 200 not having a beading portion, different from FIGS. 2 to 4. In the case of the secondary battery not having a beading portion, the electrode assembly 300 may be further received as much as the space occupied by a conventional beading portion. In other words, in the case of a secondary battery having a beading portion, due to the presence of the beading portion, the electrode assembly 300 has a limit in approaching the cap assembly 100, but in the case of a secondary battery not having a beading portion, the electrode assembly 300 may approach the cap assembly 100 as closest as possible. Therefore, when being applied to a secondary battery without a beading portion, the cap assembly 100 according to the present disclosure may increase the capacity of the secondary battery while preventing the possibility of a short caused by the deviation of the current intercepting member 150.

Meanwhile, as shown in FIG. 7, the cap assembly 100 of a secondary battery not having a beading portion may further include a cover 170. The cover 170 surrounds the gasket so that the top cap 110, the safety element 120, and the safety vent 130 may be closely adhered to each other, and may weld to the open end of the battery can 200. The cover 170 may bend in an approximately 'C' shape to surround the outer side of the upper end portion of the gasket, and the cover 170 may be partially coupled to the open end of the battery can 200 by means of laser welding or the like. For this purpose, the cover 170 may be made of nickel, aluminum, nickel alloy, aluminum alloy or the like.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cap assembly for a secondary battery, coupled to an open end of a battery can receiving an electrode assembly in which a cathode plate and an anode plate are disposed with a separator being interposed between them, the cap assembly comprising:
a top cap disposed on an uppermost portion in a protrusive form to form a cathode terminal;
a safety element disposed below the top cap to contact the top cap;
a safety vent disposed to contact the safety element;
a current intercepting member having an upper portion welded to a lower end of the safety vent and a lower portion capable of connecting to the electrode assembly;
a first gasket configured to surround the upper and side portions of an outer circumference of the current intercepting member to support the upper and side portions of the current intercepting member, the first gasket partially electrically insulating the current intercepting member and the safety vent from one another; and a second gasket configured to surround the rims of the top cap, the safety element, and the safety vent and having a lower end portion extending to surround the lower portion of the current intercepting member and contacting the lower portion of the first gasket.

2. The cap assembly for a secondary battery according to claim 1, wherein the first gasket contacts at least a part of the upper portion and the entire side portion of the current intercepting member, and the second gasket contacts the lower portion of the current intercepting member.

3. The cap assembly for a secondary battery according to claim 1, wherein a space is formed in a horizontal direction between the outer side surface of the first gasket and the inner side surface of the second gasket.

4. The cap assembly for a secondary battery according to claim 1, wherein the battery can is free from a beading portion.

5. The cap assembly for a secondary battery according to claim 4, further comprising a cover welded to an open end of the battery can to surround the second gasket so that the top cap, the safety element, and the safety vent are closely adhered to each other.

6. The cap assembly for a secondary battery according to claim 1, wherein the cap assembly has a cylindrical shape.

7. The cap assembly for a secondary battery according to claim 1, wherein a notch is formed at the safety vent.

8. The cap assembly for a secondary battery according to claim 1, wherein a gas discharge hole is formed in the current intercepting member.

9. A secondary battery, comprising:
an electrode assembly in which a cathode plate and an anode plate are disposed with a separator being interposed between them;
a battery can receiving the electrode assembly and an electrolyte; and
a cap assembly coupled to an open end of the battery can, said cap assembly including:
a top cap disposed on an uppermost portion in a protrusive form to form a cathode terminal;
a safety element disposed below the top cap to contact the top cap;
a safety vent disposed to contact the safety element;
a current intercepting member having an upper portion welded to a lower end of the safety vent and a lower portion capable of connecting to the electrode assembly;
a first gasket configured to surround the upper and side portions of an outer circumference of the current intercepting member to support the upper and side portions of the current intercepting member, the first gasket partially electrically insulating the current intercepting member and the safety vent from one another; and
a second gasket configured to surround the rims of the top cap, the safety element, and the safety vent and having a lower end portion extending to surround the lower portion of the current intercepting member and contacting the lower portion of the first gasket.

10. The secondary battery according to claim 9, wherein the first gasket contacts at least a part of the upper portion and entire side portion of the current intercepting member, and the second gasket contacts the lower portion of the current intercepting member.

11. The secondary battery according to claim 9, wherein a space is formed in a horizontal direction between the outer surface of the first gasket and the inner surface of the second gasket.

12. The secondary battery according to claim 9, wherein the battery can is free from a beading portion.

13. The secondary battery according to claim 12, further comprising a cover welded to an open end of the battery can to surround the second gasket so that the top cap, the safety element, and the safety vent are closely adhered to each other.

14. The secondary battery according to claim 9, wherein the cap assembly has a cylindrical shape.

15. The secondary battery according to claim 9, wherein a notch is formed at the safety vent.

16. The secondary battery according to claim 9, wherein a gas discharge hole is formed in the current intercepting member.

* * * * *